July 21, 1959  H. E. SMITH  2,895,594
FLEXIBLE TROUGHING ROLLER ASSEMBLY FOR BELT CONVEYOR
Original Filed April 29, 1957
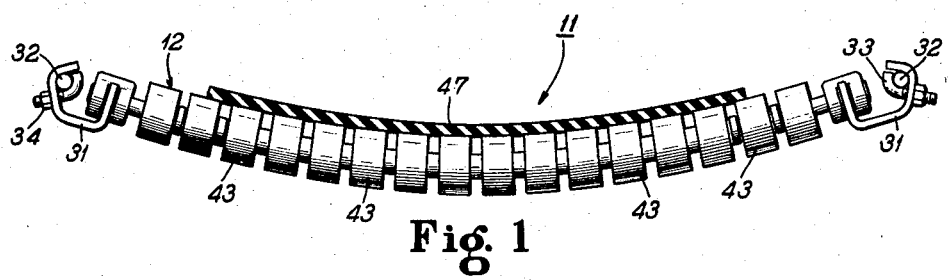
Fig. 1
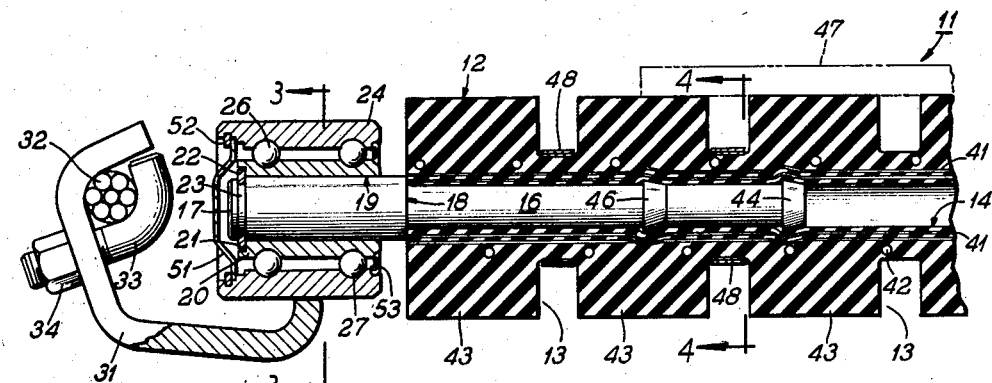
Fig. 2
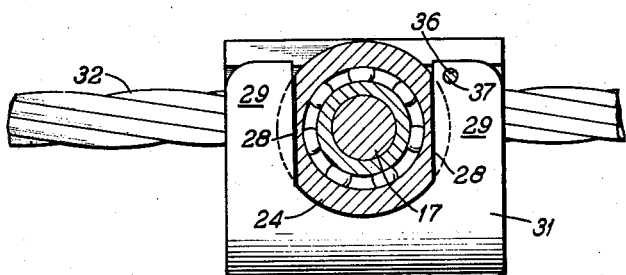
Fig. 3
Fig. 4
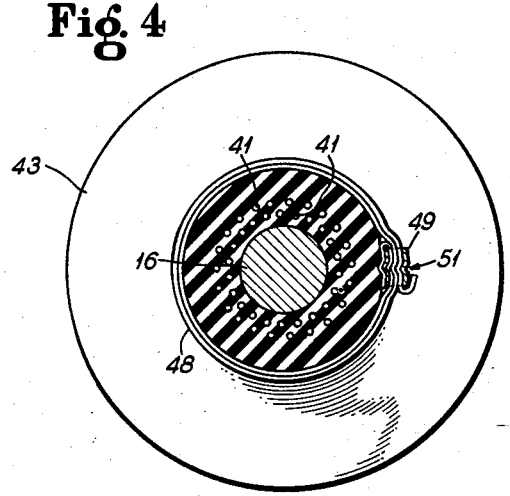
INVENTOR.
Herman E. Smith
BY
Murray A. Gleeson
ATTORNEY

2,895,594

FLEXIBLE TROUGHING ROLLER ASSEMBLY FOR BELT CONVEYOR

Herman E. Smith, Park Forest, Ill., assignor to Goodman Manufacturing Company, Chicago, Ill., a corporation of Illinois Continuation of application Serial No. 655,594, April 29, 1957. This application September 17, 1958, Serial No. 762,196

2 Claims. (Cl. 198—192)

This invention relates to conveyors and particularly to an improved flexible two-bearing troughing roller assembly for the load-carrying reach of a belt conveyor. This is a continuation of Herman E. Smith application Serial No. 655,594, filed April 29, 1957, now abandoned.

Among the objects of this invention are the provision of an improved troughing roller assembly which is light in weight, cheap, effective, and readily repairable on the job.

Other objects and advantages will be seen in view of the following description taken in connection with the drawings in which:

Figure 1 is a cross sectional view of the load-carrying reach of a belt conveyor showing a preferred form of troughing roller assembly in accordance with the present invention; the particular conveyor, shown by way of environment, being a rope sideframe conveyor disclosed in detail in Craggs and McCann Patent No. 2,773,257, issued December 4, 1956;

Figure 2 is a fragmentary enlarged partly cross sectional view of Figure 1;

Figure 3 is a cross sectional view of Figure 2 taken along the line 3—3; and

Figure 4 is a cross sectional view of Figure 2 taken along the line 4—4.

Like parts are referred to by like reference characters in the drawings.

The troughing roller assembly, generally designated 11, comprises an elongated tube 12 of rubberlike, preferably oil-resistant material such as neoprene. It is formed with a series of circumferential, axially spaced grooves 13 for maximum transverse flexibility, that is flexibility in a plane including the longitudinal axis of the tubular member; this enables the maximum degree of up and down flexibility when installed in a conveyor line. It will be realized that the member 12 does not necessarily have to be a tube, that is hollow all along its length, but at least it should have a pair of bores at its opposite ends for the practice of the present invention. As a practical matter, however, tubing does represent an advantage over many other forms of construction in that it can be made cheaply and stocked in long lengths and cut off to size when needed.

The tube 12 is here shown with an axial I.D. or bore 14. A shaft 16 is inserted into the bore at each end of the tube. Each shaft has an external enlarged portion 17 and there is a shoulder 18 between the two portions of the shaft which serves as a stop by engagement with the end of the tube 12. The shaft portion 17 fits snugly within the bore 19 of an inner bearing race 20. The inner race is formed with an external counter bore 21 and the shaft is retained by a snap ring 22 seated in the counter bore and in a groove 23 in the shaft, respectively.

There is an outer race member 24 and two rows of bearing balls 26 and 27 between the races. To keep dirt out of the bearing, a cap 51 is held in the outer race member by a snap ring connection 52. And an annular sealing member 53 is fitted between the races at the opposite end of the bearing. The outer bearing portion 24 is formed with a pair of diametrically opposed external slots 28, 28. The slots are engaged, respectively, by upstanding ears 29, 29 of an arcuate bracket 31 which has an outer portion curved about a wire rope sideframe member 32 and held fixed in place by a J-bolt 33 and nut 34. One of the ears 29 will preferably be drilled as at 36 for insertion of a pin 37 to retain the bearing cartridge against jumping out of the bracket under excessive vibrating conditions.

A troughing roller assembly must have considerable strength in tension, it must be extremely flexible, and it must remain round. The present troughing roller assembly meets all those requirements and at the same time it is light weight, cheap, and readily repairable on the job.

To take the tensile loads, the tube 12 will be molded with one or more layers of reinforcing material adjacent the inner bore 14, to get it as close as possible to the neutral axis of the assembly, for maximum combined strength and flexibility. The layer of reinforcing elements, designated 41, 41, may comprise strands of nylon, Dacron, long staple cotton, steel wire, or the like. They will be incorporated in the tube by using standard rubber molding techniques, and one technique which is available is wrapping an initial rubber sheet about a mandrel sized to the bore 14, then wrapping a suitable layer of fabric contining the elements 41 about that sheet, then winding on a coil spring 42 if needed to maintain roundness under the load conditions to be encountered, followed by applying more rubber or rubberlike material and molding the alternate grooves 13 and discs 43. If using the elements 41 in the form of a sheet of fabric, it should preferably be laid in place on the bias. In special cases, braided and other specially woven fabrics may be desirable to obtain particular characteristics.

The shaft 16 at each end of the tube is shown here as including a pair of enlarged portions 44, 46, contoured to bite into the inner tube wall 14 and resist outward movement.

The upper run 47 of the belt will, in practice, constantly shift from one side of the assembly to the other. It is therefore essential that the means employed to clamp the shaft 16 into the tube not extend beyond the outer diameter of the portions 43; otherwise they would catch the edge of the belt and possibly spill the load or damage the edge of the belt. Accordingly, one of the features of this invention is to hold the assembly together by clamps wholly recessed within some of the grooves 13.

The clamp means is shown much enlarged in Figure 4 and comprises simply a band of metal 48 pulled tight through an eye 49 which is mounted on one end of itself, then bent up and over and fixed permanently in place by center punching as at 51. This is one form of clamp which will function as required. Others, obviously, could be employed. The clamping connection is effective to hold the two shafts 17 and the reinforcing layer 41 into intimate, frictional contact so as to withstand the tensile requirements of the job, while providing the flexibility required.

One of the important precautions to observe in carrying out the present invention is to avoid a construction in which the elements 41, 41 can chafe against one another. Chafing generates heat and reduces service life. It is important that each individual strand 41 be separated by a layer of rubberlike material from its neighbor. Thus, working or sliding of the strands relative to one another as they are rotated between top and bottom positions in the assembly, is accommodated simply by deflection of these layers of rubberlike materials and not rubbing of the materials 41 against one another.

While the invention has been described in terms of an embodiment which it has assumed in preference to others, the scope of the invention should not be deemed to be limited by the precise embodiment herein shown, other embodiments being intended to be reserved especially as they fall within the scope of the claims herein appended.

I claim:

1. A flexible troughing roller assembly comprising: an elongated tube of flexible rubberlike material, said tube having a plurality of circumferentially extending grooves spaced along the length of said tube for improved flexibility transverse to the length thereof, said tube having a layer of relatively high strength reinforcing material adjacent the inner wall of said tube and effective to strengthen said tube against tension loads, a shaft extending into said tube in engagement with said inner wall thereof, a connection between each shaft and its corresponding end portion of the tube including a clamp wholly recessed within one of said grooves and exerting radially inward pressure through said tube and said reinforcing material to create a gripping engagement between said shaft and the tube portion adjacent said reinforcing material, said gripping engagement effectively resisting tension loads tending to pull said shaft out of said tube, and a bearing supporting said shaft for rotation about an axis within said tube.

2. A flexible troughing roller assembly comprising: an elongated tube of flexible rubberlike material, said tube having a plurality of circumferentially extending grooves spaced along the length of said tube for improved flexibility transverse to the length thereof, said tube having a layer of relatively high strength reinforcing material adjacent the inner wall of said tube and effective to strengthen said tube against tension loads, a shaft extending into said tube in engagement with said inner wall thereof, a pair of spaced lands on said shaft spaced one on each side of one of said circumferentially extending grooves, a connection between said shaft and its corresponding end portion of the tube including a clamp wholly recessed within the said one circumferentially extending groove disposed between said spaced lands and exerting radially inward pressure through said tube and said reinforcing material to create a gripping engagement on said shaft between said spaced lands and the tube portion adjacent said reinforcing material, said clamping and gripping engagement effectively resisting tension loads tending to pull said shaft out of said tube, and a bearing supporting said shaft for rotation about an axis within said tube.

References Cited in the file of this patent
UNITED STATES PATENTS

| | | |
|---|---|---|
| 1,034,491 | Nelson | Aug. 6, 1912 |
| 2,423,407 | Searles et al. | July 1, 1947 |
| 2,724,490 | Barnish | Nov. 22, 1955 |